Figure 1:
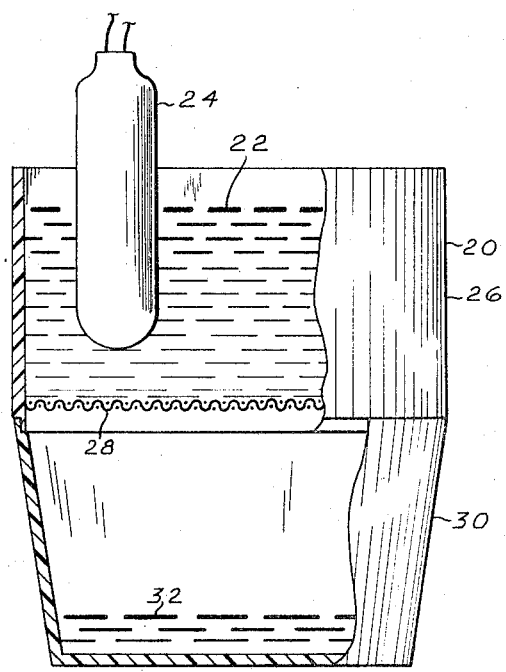

Feb. 21, 1967  M. N. A. PETERSON  3,305,481

ULTRASONIC SIEVING

Filed Dec. 14, 1964

INVENTOR.
Melvin N.A. Peterson
BY
FULWIDER, PATTON, RIEBER, LEE & UTECHT
ATTORNEYS 3,305,481
ULTRASONIC SIEVING
Melvin N. A. Peterson, Del Mar, Calif., assignor to The
Regents of the University of California
Filed Dec. 14, 1964, Ser. No. 417,995
1 Claim. (Cl. 210—19)

The present application relates to a method of sieving suspensions in fluids. The method is a procedure for removing a portion of the suspended materials from fluids by subjecting the fluids containing suspensions directly to ultrasonic vibrations when it is in sieving relation with a sieve.

Other features and the advantages of the present invention will be apparent from the following description, reference being had to the accompanying drawing wherein preferred embodiments of the invention are illustrated.

Figure 2:
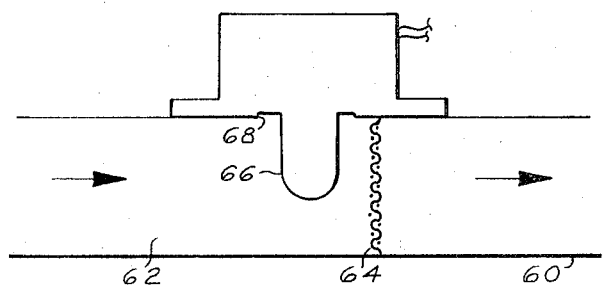

In the drawing:

FIG. 1 is a fragmentary view, partly in section, showing a gravity fed sieve; and FIG. 2 is a schematic view, partly in section, showing a forced fed sieve.

FIG. 1 illustrates a gravity fed sieve 20 which contains fluid 22 containing suspensions. This fluid is subjected to ultrasonic vibrations. Such vibrations may be by immersing a probe 24 in the fluid. Sieve 20 comprises an open bottom tank 26 having meshed sieve 28 across the bottom end thereof. Container 30 is placed below tank 26 so as to collect the sieved material 32.

FIG. 2 shows the ultrasonic sieving method as applied to a forced flow system (e.g. flow in a pipe). Conduit 60 is shown transporting fluid 62 containing suspensions. Conduit 60 has a meshed sieve 64 positioned transversely in the conduit. Ultrasonic probe 66 is immersed in the fluid 62 by being inserted through hole 68 in conduit 60.

In the process of sieving fluids containing suspensions it has been found that subjecting suspensions to ultrasonic vibrations greatly facilitates the sieving process. The normal consequences of sieving very fine grained suspensions results in clogging the sieve with an impervious layer of the suspended material. The ultrasonic agitation effectively prevents this layer from forming, and permits much more efficient processing.

The range of meshed sieve sizes in which the method seems most effective is from one hundred microns down to the smallest for which sieves are now available, about five microns. The sieve should be formed of some rather resistant material, such as stainless steel, brass, nylon, etc., depending upon the characteristics of the fluids and suspensions.

Though the drawings indicate a sieve, the method would be equally applicable to filtering. Therefore, the words "sieve" and "sieving" as herein used, comprehend "filter" and "filtering," respectively.

The present invention is particularly useful in any flow or back process involving removal or separation of small particles in suspension. One application is in marine mining, where separation by size would be an efficient way to segregate the minerals in suspension. The method has the additional advantage of strongly suppressing flocculation, which is a significant problem in instances where the suspending liquid contains ions in solutions, such as in sea water. The method can be useful in the preparation of drugs, where extensive filtration is necessary. It could be used in the preparation of chemicals, fine grains of small particles, etc.

Though the method is particularly useful for sieving fluid containing suspensions, the method would be useful for sieving and filtering generally.

While the forms of embodiment herein shown and described constitute preferred forms, it is understood that other forms may be adopted falling within the scope of the claim that follows

I claim:

The step in the method of sieving a suspension of solid particles in a fluid and the prevention of clogging of the sieve by an impervious layer of the solid particles, which consists in subjecting the fluid, while in a container in sieving relationship to another container, directly to ultrasonic vibrations by an ultrasonic probe disposed in the fluid, the said seive being relatively stationary with respect to the said containers.

References Cited by the Examiner

UNITED STATES PATENTS

| 2,514,471 | 7/1950 | Calhoun | 210—19 |
| 2,799,398 | 7/1957 | Heymann | 210—19 X |
| 3,190,793 | 6/1965 | Starke | 134—1 X |
| 3,206,397 | 9/1965 | Harvey | 210—22 X |

FOREIGN PATENTS

| 508,675 | 6/1939 | Great Britain. |

MORRIS O. WOLK, *Primary Examiner.*

E. G. WHITBY, *Assistant Examiner.*